Jan. 2, 1973  A. M. MITCHELL  3,708,273
AUTOMATIC TUBE TRANSFER FIREPOLISHING
APPARATUS AND METHOD

Filed Dec. 16, 1970  2 Sheets-Sheet 1

INVENTOR.
Angelo M. Mitchell
BY
Ernst A. Reif
ATTORNEY

Jan. 2, 1973   A. M. MITCHELL   3,708,273
AUTOMATIC TUBE TRANSFER FIREPOLISHING
APPARATUS AND METHOD
Filed Dec. 16, 1970   2 Sheets-Sheet 2
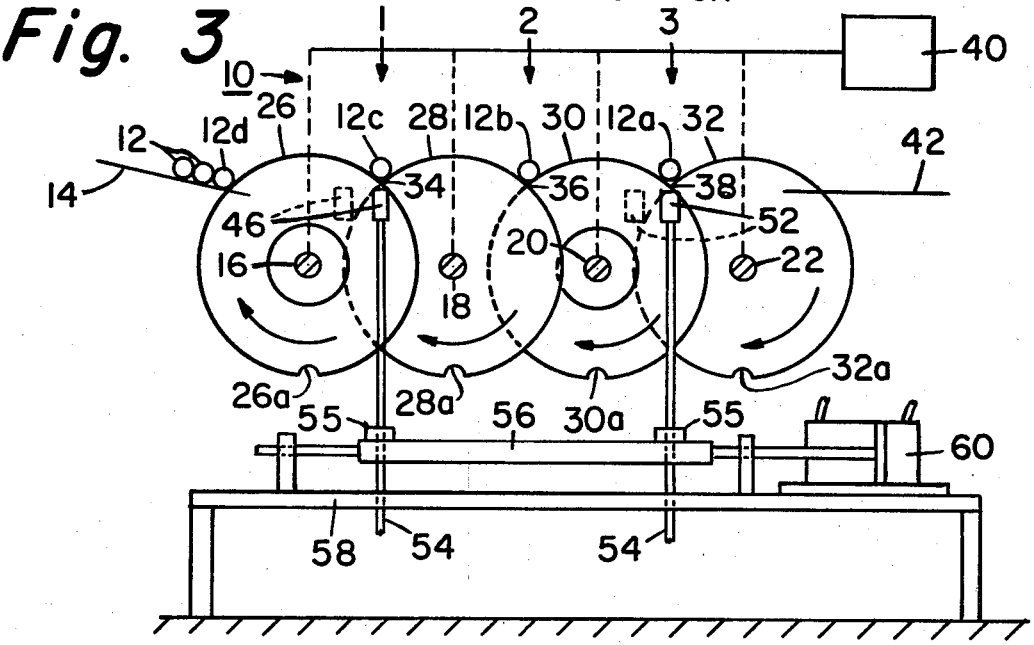
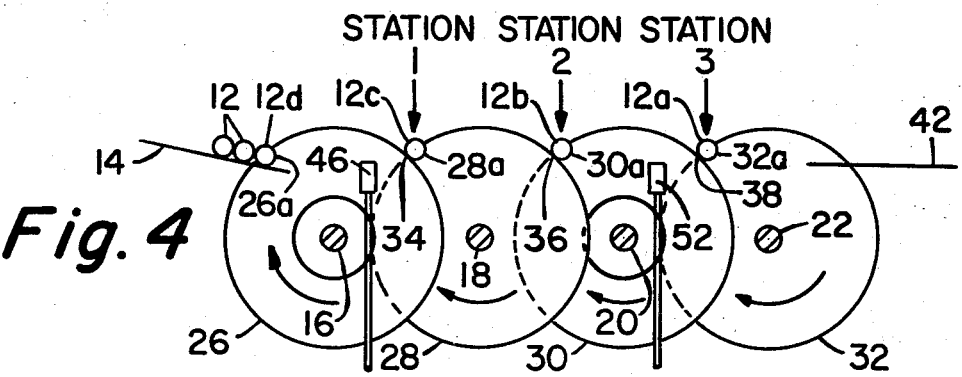
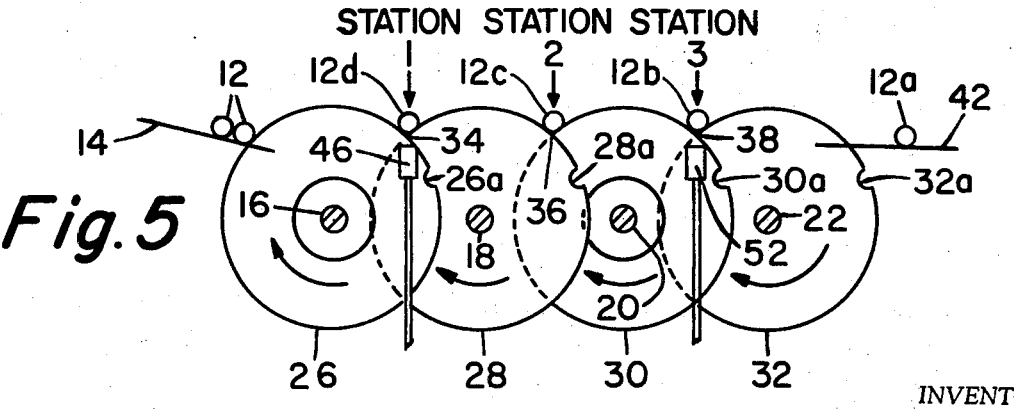
INVENTOR.
Angelo M. Mitchell
BY
ATTORNEY United States Patent Office 3,708,273
Patented Jan. 2, 1973

3,708,273
AUTOMATIC TUBE TRANSFER FIREPOLISHING APPARATUS AND METHOD
Angelo Michael Mitchell, Danville, Va., assignor to Corning Glass Works, Corning, N.Y.
Filed Dec. 16, 1970, Ser. No. 98,597
Int. Cl. C03b 29/04
U.S. Cl. 65—120   6 Claims

ABSTRACT OF THE DISCLOSURE

An automatic transfer firepolishing apparatus and method for firepolishing glass tubes; the transfer mechanism including multiple spaced sets of tandem discs rotatable on spaced axes with each disc having at least one peripheral notch for transferring the tube. The overlapping disc peripheries provide several stations upon which the tube may be supported and rotated while being sequentially heated at alternate stations by movable, continuously-operating heating means. A method of firepolishing sets forth the transferring, rotating, heating and cooling steps required in sequentially firepolishing pluralities of alternating, axially-spaced first and second portions of the tube.

BACKGROUND OF THE INVENTION

The field to which this invention pertains is that of firepolishing glass tubing, and more particularly to an automatic tube transfer firepolishing apparatus for the removal of scuffs, scratches and draw marks etc., from glass tubes.

In the manufacture of glass tubes and/or glass rods, for example in the production of 96 percent silica glass, the tubes and rods undergo multiple processing, handling and transporting steps which can cause undesirable surface blemishes such as scuffs, scratches and draw marks. These surface blemishes are removed in a known firepolishing process wherein the tube is simultaneously rotated and heated, such as by means of multiple axially spaced gas-oxygen flame burners, to the vicinity of the glass softening temperature. In order to prevent sagging of the tube during this heating operation, the burners must be short and the tube must be supported on either side of the burners. Due to the necessary tube support, two firepolishing stations are required to totally firepolish each tube, with the second station polishing the area supported by the support rollers at the first station. Interposed between the two firepolishing stations is an idle station which is necessary in order to arrange the tube supports or rollers so that the second firepolishing station can firepolish the areas previously occupied by the rollers at the first firepolishing station. The operational cycle at each firepolishing station also includes a short cooling period which is necessary in order to allow sufficient cooling of the tube to prevent sagging during the manual transfer thereof. In the prior art, the burners are turned off during this cooling operation and then re-kindled at the start of the next firepolishing operation.

SUMMARY OF THE INVENTION

The automatic tube transfer firepolishing apparatus and method of this invention obviate the manual transfer between stations thereby not only eliminating an operator, but also increasing product, quality, and uniformity. Furthermore, the incessant activation and deactivation of the burners is also eliminated by reciprocating the continuously-operating heating means between a rest position, which is away from the tubes, to a firepolishing position directly vertically below the tubes.

It is an object of this invention to provide a means for automatically transferring, rotating and supporting a tube in step-by-step fashion along a generally horizontal path through a plurality of stations and to provide means for sequentially heating at alternate stations, pluralities of axially-spaced recurring first and second portions of the tube.

It is another object of this invention to provide a tube transferring, rotating and supporting means that includes at least four pairs of tandem discs, rotatable on equally spaced axes parallel to each other, with the periphery of each pair of discs overlapping the periphery of at least one other pair of discs. Each pair of discs is axially spaced on its axis and each disc has at least one peripheral notch for transferring the tube. The overlapping disc peripheries provide, at their upper intersections, at least three sequential stations upon which the tube may be supported and rotated about its own axis.

It is yet another object of this invention to provide a novel method of firepolishing the outer surface of a glass tube to produce a smooth, blemish-free surface.

Other features and advantages of the present invention should be readily apparent by reference to the following specification in conjunction with the accompanying drawings forming a part thereof.

BRIEF DESCRIPTION OF THE DRAWINGS

FIG. 3 is a sectional view taken on line 3—3 of FIG. 1 and illustrates the automatic glass tube transfer and burner shift mechanisms of the firepolishing apparatus.

FIGS. 4 and 5 are simplified sequential representations of the automatic tube transfer mechanism shown in FIG. 3.

DESCRIPTION OF THE PREFERRED EMBODIMENTS

Figure 1:
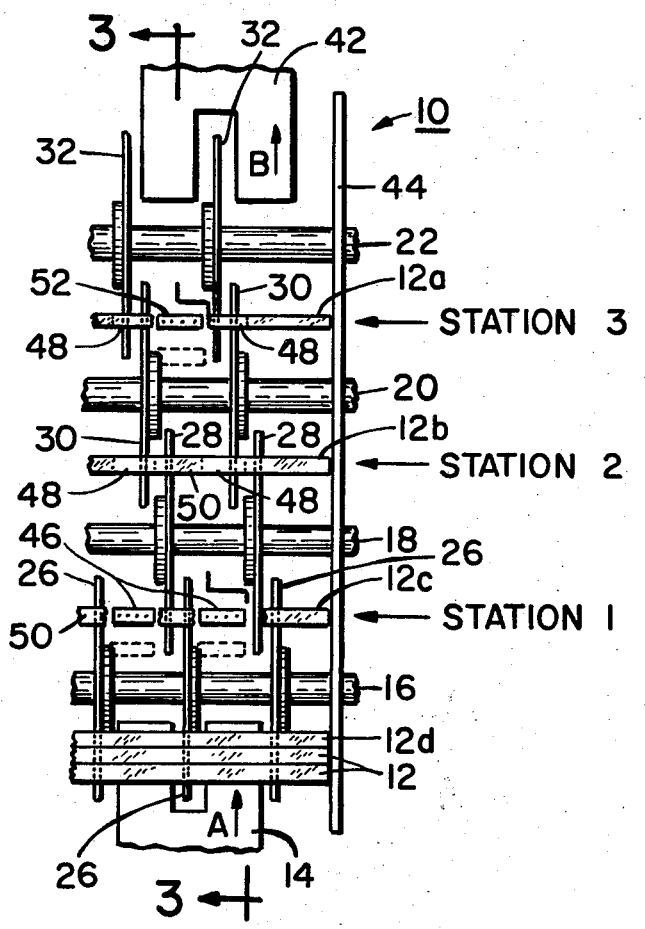
FIG. 1 is a top view of a schematic representation of a part of an automatic tube transfer firepolishing apparatus for firepolishing glass tubing.

Referring now to the drawings in detail, FIG. 1 is a top view of a schematic representation of a part of an automatic tube transfer apparatus or machine 10 for firepolishing individual glass tubes 12. A first conveyor or loading rack 14 transports glass tubes 12 in a transverse direction, with tubes 12 being moved either by gravity or some mechanical arrangement in the direction of arrow A. Some tubes 12 are further defined by suffixes *a* to *d*, with these suffixes merely serving to denote the locations of tubes 12 as they are processed through the firepolishing cycle. The transfer device or mechanism of machine 10 comprises four axes 16, 18, 20 and 22, each having multiples of equally spaced discs 26, 28, 30 and 32 respectively. The periphery of each of said discs overlaps the periphery of at least one other disc, e.g., as best seen in FIGS. 3–5, overlapping discs 26, 28 create a first upper intersection 34, which is also denoted as station 1 of machine 10; overlapping discs 28, 30 create a second upper intersection 36, denoted as station 2; and overlapping discs 30, 32 create a third upper intersection 38, denoted as station 3.

The periphery of each of discs 26, 28, 30, 32 is provided with a notch or slot 26a, 28a, 30a, 32a, respectively. As shown in FIGS. 3–5 a variable speed drive means 40 concurrently and continuously drives or rotates all four axes 16, 18, 20, 22 in any desired manner, thereby causing discs 26, 28, 30, 32 to rotate in phase in the same direction as indicated by the arrows thereon, with all notches 26a, 28a, 30a, 32a being aligned at all times.

The automatic transfer mechanism portion of this invention operates in the following manner:

In FIG. 3, tubes 12a, 12b and 12c are simultaneously rotating at stations 1, 2 and 3 respectively, while discs 26, 28, 30, 32 are rotating clockwise, with notches 26a, 28a, 30a, 32a being in phase.

In FIG. 4 discs 26, 28, 30, 32 are shown rotated to the extent that notches 28a, 30a, 32a have passed through upper disc intersections 34, 36, 38 respectively, thereby picking up tubes 12c, 12b, 12a respectively. For ease of illustration, notch 26a is shown picking up tube 12d from conveyor 14 at the same time as the other notches are picking up the tubes rotating at stations 1 to 3, as just described. While tube 12d may be picked up at the same time as tubes 12a, 12b and 12c, this is not mandatory, since the pickup point for tube 12d depends upon the placement and angle of conveyor 14 relative to disc 26, i.e. tube 12d could also be picked up before or after the pickup of tubes 12a, 12b and 12c.

Figure 2:
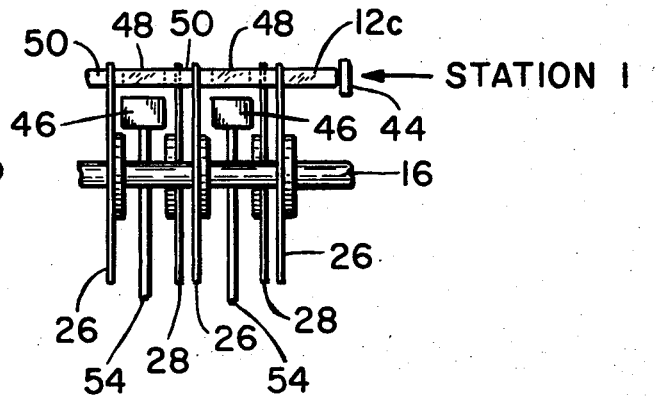
FIG. 2 is an end view of a schematic representation of a portion of the automatic tube transfer apparatus for firepolishing glass tubing.

In FIG. 5 discs 26, 28, 30, 32 are shown rotated to the extent that notches 28a and 30a have transported tubes 12c and 12b from stations 1 and 2 to stations 2 and 3, respectively. Since, as previously noted, all notches are in phase, notch 26a deposits tubes 12d (picked up from conveyor 14 as shown in FIG. 4) at station 1 at the same time tubes 12c and 12b are deposited at stations 2 and 3 respectively. Notch 32a (which is shown in FIG. 4 as picking up tube 12a at station 3 at the same time tubes 12b and 12c were picked up at stations 2 and 1 respectively) is shown in FIG. 5 as having been discharged into a second conveyor 42. Second conveyor 42, similar to first conveyor 14, also transports tubes 12 either by gravity or some mechanical arrangement in the direction of arrow B. While tube 12a may be discharged into second conveyor or unloading rack 42 at the same time as tubes 12b, 12c and 12d are deposited at stations 3, 2 and 1 respectively, this is not mandatory. The discharge point for tubes 12a depends upon the placement and angle of conveyor 42 relative to disc 32; i.e., tube 12a could also be discharged before or after the deposit of tubes 12b, 12c and 12d at stations 3, 2 and 1, respectively. In order to prevent tubes 12 from axial movement out of stations 1, 2 and 3 at least one of each of their end faces is biased against a tube guard rail 44 (as best seen in FIGS. 1 and 2).

The automatic transfer function of machine 10 may best be summarized as follows: During each complete revolution of discs 26, 28, 30 and 32, the four tubes 12a to 12d are manipulated so that:

(a) one tube (12a) is discharged to the second conveyor (42);

(b) one tube (12d) is picked up from the first conveyor (14); and (c) two tubes (12c and 12b) are advanced from stations 1 and 2 to stations 2 and 3.

The firepolishing process involves the removal of scuffs, scratches as draw marks etc. from glass tubes 12. This is accomplished by rotating each tube 12 and heating it with gas-oxygen flame burners to just under the softening temperature of the glass. In order to prevent sagging, the burners must be short and tubes 12 must be supported on either side of the burners. As best seen in FIG. 2, a plurality of equally spaced burners 46 are utilized at station 1 below the rotating tube 12c, thus heating spaced tube areas 48 of tube 12c rotating directly thereabove. The length of spaced tube areas 48 corresponds approximately to the length of burners 46. Tube areas 48 are spaced apart to allow for the support of tube 12c by the peripheries of overlapping discs 26 and 28. Thus, tube areas 48 are spaced apart by alternate tube areas 50, with areas 50 being approximately equal in length to those of tube areas 48. As best shown in FIG. 2, at station 1, tube 12c is being firepolished in spaced areas 48 while simultaneously being rotated and journalled in tube areas 50 by the overlapping peripheries of multiples of rotating disc 26 and 28.

Because of the necessary tube support (at station 1 by discs 26 and 28 in tube areas 50) a second firepolishing operation is required to totally firepolish tube 12c, i.e., tube areas 50 as well as tube areas 48. Tube areas 50 are firepolished at station 3 by plurality of burners 52 (although only one burner is illustrated for the sake of clarity).

Even though a part of tube 12a, as shown at station 3 in FIG. 1, is broken away to show the location of burner 52, it can be seen that tube 12a is being firepolished in a second firepolishing operation in tube area 50 while being rotatably supported in tube areas 48 (polished at station 1 as previously described) by the overlapping peripheries of multiples of rotating discs 30 and 32.

As best seen in FIGS. 1 and 3, burners 46 and 52, which are substantially similar, are movable from a fire polishing position, i.e., when they are positioned directly vertically below rotating tubes 12, to a rest position, shown in dashed lines, where they have been moved transversely away from below tubes 12. FIG. 3 shows burners 46 and 52 attached on the upper ends of fuel supply pipes 54, the lower ends of which are connected to fuel supply manifolds (not shown) in any well-known manner. Fuel supply pipes 54 are attached by adjustable collars 55 to a carriage member 56 which is capable of being reciprocated on support structure 58 by a variable speed drive means 60 so as to reciprocate burners 46 and 52 between their firepolishing and rest positions.

The firepolishing sequence at each of the two firepolishing stations operates in a substantially identical manner as follows:

Each complete 360° revolution of the discs, which may be thought of constituting one complete operational cycle, is made up of three sub-cycles namely the firepolishing cycle, the cooling cycle and the transfer cycle. For example, as tube 12c is deposited at station 1 and is thereupon rotated by discs 26 and 28, burners 46 are in the firepolishing position (FIG. 3) and begin firepolishing tube areas 48 (FIG. 2). At the completion of the firepolishing cycle, burners 46 are moved to the rest position (FIG. 4) and tube 12c undergoes a short cooling cycle which is necessary in order to allow tube 12c to cool sufficiently to prevent its sagging (in firepolished areas 48) during its transfer to station 2. During the transfer cycle, as tube 12c is being transported to station 2 and tube 12d is being transported from first conveyor 14 to station 1, burners 46 are moved back to the firepolishing position so that the operational cycle may be repeated once tube 12d is deposited at station 1.

It should be noted that although only two firepolishing stations, namely stations 1 and 3, are required for firepolishing spaced alternating areas 48 and 50 of tubes 12, three transfer stations, namely stations 1, 2 and 3 are required. Station 2 is an idle station which is necessary in order to physically re-arrange the discs so that station 3 can firepolish areas 50 which were previously occupied by rollers 26 and 28 at station 1 as tube areas 48 were being firepolished. An examination of FIG. 1 will show that firepolishing cannot be accomplished at station 2 because rollers 28 are still in contact there with tube areas 50 which remain yet to be firepolished and that transfer to station 3 is required so that previously polished tube areas 48 can be utilized as support areas by rollers 30 and 32.

The overall combined automatic transfer and firepolishing functions of machine 10 may be described as follows:

(a) At time zero, a tube 12a of finite length is picked up from conveyor 14 by aligned notches 26a in equally spaced discs 26 on axis 16 and is carried into station 1, while at the same time burners 46 are moved by variable speed drive means 60, from their rest position back into their firepolishing position vertically below tube areas 48 of tube 12a;

(b) While tube 12a is being rotated by rotating discs 26 and 28 in tube areas 50, burners 46 are firepolishing unsupported tube areas 48 above burners 46;

(c) At the end of the firepolishing cycle, burners 46 are moved into their rest position transversely away from tube 12a, as tube 12a continues to rotate;

(d) At the end of the cooling cycle, tube 12a is picked up by disc notches 28a and carried to station 2, which is an idle station, while at the same time another tube 12b (after being picked up from conveyor 14) is carried into station 1, and steps (a) through (c) are repeated on tube 12b;

(e) At the end of the idle cycle in station 2, tube 12a is picked up by disc notches 30a and carried to station 3, while at the same time tube 12b is advanced to station 2 and another tube 12c is carried into station 1;

(f) As tube 12a is carried into station 3, burners 52 are moved from their rest position back into their firepolishing position vertically below tube areas 50 of tube 12a;

(g) While tube 12a is being rotated by discs 30 and 32 in tube areas 48, burners 52 are firepolishing unsupported tube areas 50;

(h) At the end of the firepolishing cycle, burners 52 are moved back to their rest position and tube 12a continues to rotate for the duration of the cooling cycle; and (i) At the end of the cooling cycle, tube 12a is picked up by disc notches 32a and carried to conveyor 42 for discharge thereupon, while at the same time, tube 12b is being advanced to station 3; tube 12c is being advanced to station 2 and another tube 12d is being carried into station 1.

Thus, it may be seen that during each complete revolution of the discs, one tube is fed into station 1 of machine 10, one tube is discharged from station 3 of machine 10, and two tubes are advanced from stations 1 and 2 to stations 2 and 3, respectively, with the firepolishing operations taking place at stations 1 and 3.

While the drawings are only schematic representations of a part of automatic tube transfer firepolishing apparatus 10, it should be self-evident that the number of discs on each of axes 16, 18, 20 and 22 is dependent on the actual length of tubes 12 and the number of axes is dependent on the number of stations desired for the firepolishing operation, with three stations being the minimum number required. Preferably, the axes are hollow so that cooling air can be channelled therethrough. In actual operation, cooling air is preferably also blown through tubes 12 at each of the three stations.

It should also be noted that the diameter of discs 26, 28, 30 and 32 and size of disc notches 26a, 28a, 30a and 32a could of course be varied to accommodate the diameters of various tubes 12 that require firepolishing. For example, the radius of notch 26a should be approximately the same as the radius of the largest tube 12 to be handled. At the same time, however, for a given notch dimension there is a minimum radius tube that can be handled, i.e. the smallest tube that will satisfactorily transfer from the notches at the various stations, with this minimum size being most readily determined during actual operation of the firepolishing apparatus. For a given cycle time, the tube r.p.m. is a function of the disc diameter, with the minimum tube r.p.m. being the r.p.m. that is necessary to keep the tube from sagging during the firepolishing cycle. The firepolishing cycle time is of course, the minimum time required to completely remove all scuffs, scratches and draw marks etc. from the glass tube. The minimum tube r.p.m. and firepolishing cycle times are generally experimentally determined for each diameter and wall thickness of glass tubing. As a general rule, the operational cycle time (the time for one 360° revolution of the discs) is divided approximately half and half between the firepolishing cycle time and the combination of the cooling and transfer cycle times. Axes 16, 18, 20 and 22 of course are all driven concurrently by variable speed drive means 40 so that the operational cycle time may be adjusted for various tube diameters, all thicknesses and glass compositions.

It should further be noted that in addition to firepolishing glass tubing, it is also possible to firepolish solid glass rods.

While the invention has been described in connection with possible forms or embodiments thereof, it is to be understood that the present disclosure is illustrative rather than restrictive and that changes or modifications may be resorted to without departing from the spirit of invention or scope of the claims which follow.

I claim:

1. In an automatic tube transfer firepolishing apparatus for sequentially firepolishing pluralities of axially spaced recurring first and second tube portions, the sum of which constitutes the outer surface of a glass tube, or rod the combination comprising:
   (a) means for automatically transferring, rotating and supporting said tube in step-by-step fashion along a generally horizontal path through a plurality of stations;
   (b) means for sequentially heating, at alternate stations, said pluralities of axially spaced recurring first and second tube portions, respectively; and
   (c) means for moving said heating means between rest positions, away from said tube, and firepolishing positions, near said tube.

2. The firepolishing apparatus of claim 1 wherein said heating means comprises:
   (a) a plurality of axially spaced first heaters, said heaters being arranged, at one station, below and along the axial extent of said tube and aligned with one of the pluralities of said axially spaced first and second tube portions; and
   (b) a plurality of axially spaced second heaters, said heaters being arranged, at an alternate station, below and along the axial extent of said tube and aligned with the other of the pluralities of said axially spaced first and second tube portions, with said moving means moving said pluralities of first and second heaters between said rest positions and said firepolishing positions.

3. The firepolishing apparatus of claim 2 wherein said pluralities of axially spaced first and second heaters are axially offset with respect to each other and are located at first and third stations respectively.

4. The firepolishing apparatus of claim 3 wherein said pluralities of axially spaced first and second heaters are comprised of continuously-operating gas-oxygen flame burners extending along essentially the total axial extent of said tube.

5. The method of firepolishing the outer surface of a glass tube or rod which comprises the steps of:
   (a) transferring said tube from a loading means to a first station while simultaneously moving a first heating means, having spaced multiple burners, from a rest position, which is away from said tube, to a firepolishing position vertically below said tube;
   (b) rotating said tube about its own axis and rotatably supporting it on a plurality of axially spaced alternate first portions while heating a plurality of axially spaced, unsupported alternate second portions of said tube for a predetermined length of time;
   (c) rotating said tube about its own axis for a predetermined length of time during and after moving said first heating means back to said rest position;
   (d) transferring said tube from said first station to a second station;
   (e) rotating said tube about its own axis for a predetermined length of time;
   (f) transferring said tube from said second station to a third station while simultaneously moving a second heating means, having spaced multiple burners, from a rest position, which is away from said tube, to a firepolishing position vertically below said tube;
   (g) rotating said tube about its own axis and rotatably supporting it on said plurality of axially spaced alternate second portions while heating said plurality of axially spaced unsupported alternate first portions for a predetermined length of time;

(h) rotating said tube about its own axis for a predetermined length of time during and after moving said second heating means back to said rest position; and
(i) transferring said tube from said third station to an unloading means.

6. The method of firepolishing the outer surface of a plurality of glass tubes or rods which comprises the steps of:
   (a) transferring a first tube from a loading means to a first station while simultaneously moving a first heating means, having spaced multiple burners, from a rest position, which is away from said first tube, to a firepolishing position vertically below said first tube;
   (b) rotating said first tube about its own axis and rotatably supporting it on a plurality of axially spaced, alternate first portions while heating a plurality of axially spaced, unsupported alternate second portions of said first tube for a predetermined length of time;
   (c) rotating said first tube about its own axis for a predetermined length of time during and after moving said first heating means back to said rest position;
   (d) transferring said first tube from said first station to a second station, while at the same time a second tube is proceeding through step (a);
   (e) rotating said first tube about its own axis for a predetermined length of time, while at the same time said second tube is proceeding through steps (b) and (c);
   (f) transferring said first tube from said second station to a third station while simultaneously moving a second heating means, having spaced multiple burners, from a rest position, which is away from said first tube, to a firepolishing position vertically below said first tube, while at the same time said second tube is proceeding through step (d) and a third tube is proceeding through step (a);
   (g) rotating said first tube about its own axis and rotatably supporting it on said plurality of axially spaced alternate second portions while heating said plurality of axially spaced unsupported alternate first portions for a predetermined length of time, while at the same time said second tube is starting step (e) and said third tube is proceeding through step (b);
   (h) rotating said first tube about its own axis for a predetermined length of time during and after moving said second heating means back to said rest position, while at the same time said second tube is completing step (e) and said third tube is proceeding through step (c); and
   (i) transferring said first tube from said third station to an unloading means, while said second tube is proceeding through step (f), said third tube is proceeding through step (d) and a fourth tube is proceeding through step (a).

References Cited

UNITED STATES PATENTS

| | | | |
|---|---|---|---|
| 2,595,077 | 4/1952 | Hughes et al. | 65—284 X |
| 1,473,675 | 11/1923 | Halversen | 65—284 X |

ARTHUR D. KELLOGG, Primary Examiner

U.S. Cl. X.R.

65—104, 113, 252, 284